(12) United States Patent
Yun et al.

(10) Patent No.: US 10,928,997 B2
(45) Date of Patent: Feb. 23, 2021

(54) MOBILE TERMINAL AND CONTROL METHOD THEREOF

(71) Applicant: LG ELECTRONICS INC., Seoul (KR)

(72) Inventors: Jiwon Yun, Seoul (KR); Taeho Kim, Seoul (KR); Jeongheon Yoo, Seoul (KR); Chansoo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/635,540

(22) PCT Filed: Sep. 18, 2017

(86) PCT No.: PCT/KR2017/010185
§ 371 (c)(1),
(2) Date: Jan. 30, 2020

(87) PCT Pub. No.: WO2019/027090
PCT Pub. Date: Feb. 7, 2019

(65) Prior Publication Data
US 2020/0257436 A1    Aug. 13, 2020

(30) Foreign Application Priority Data

Aug. 1, 2017   (KR) .................. 10-2017-0097737

(51) Int. Cl.
*G06F 3/00*     (2006.01)
*G06F 3/0484*   (2013.01)

(52) U.S. Cl.
CPC .................. *G06F 3/04845* (2013.01)

(58) Field of Classification Search
CPC ....... G06F 3/04845; G06F 2203/04803; G06F 2203/04806; G06F 2203/04808; G06F 3/04883; G06F 3/0486; H04N 5/232
See application file for complete search history.

(56) References Cited

U.S. PATENT DOCUMENTS

| | | | | |
|---|---|---|---|---|
| 2010/0302409 | A1* | 12/2010 | Matas | H04N 5/23293 348/231.99 |
| 2014/0071323 | A1* | 3/2014 | Yi | G06F 3/04883 348/333.01 |

(Continued)

FOREIGN PATENT DOCUMENTS

| | | |
|---|---|---|
| KR | 20100055145 | 5/2010 |
| KR | 20140125073 | 10/2014 |

(Continued)

OTHER PUBLICATIONS

Prasanna K. Avanigadda et al., Content Based Selection of Capture Resolution in Smartphone Camera, Dec. 1, 2015, IEEE, pp. 1-4 (Year: 2015).*

(Continued)

*Primary Examiner* — Tam T Tran

(57) ABSTRACT

A portable electronic device according to the present disclosure comprises: a memory for storing moving image data; a touch screen for receiving a touch input related to a summation of the moving image data; and a control unit for generating a summary of the moving image data in response to the touch input, wherein the control unit extracts objects included in the moving image data, detects a section in which at least one object among the extracted objects appears and then disappears, and generates a summary of the moving image data by editing the moving image data on the basis of the detected section.

14 Claims, 21 Drawing Sheets

(56) References Cited

U.S. PATENT DOCUMENTS

2014/0125856 A1   5/2014  Kim et al.
2015/0177937 A1*  6/2015  Poletto .................... G06F 3/167
                                                    715/739
2016/0366344 A1* 12/2016  Pan ........................... G06T 5/20
2017/0034428 A1*  2/2017  Kwon .................. G06F 3/0488

FOREIGN PATENT DOCUMENTS

KR   1020150017435   2/2015
KR     20150026561   3/2015

OTHER PUBLICATIONS

Jianying Hu et al., Identifying Story and Preview Images in News Web Pages, Jun. 1, 2003, IEEE Computer Society, pp. 1-5 (Year: 2003).*

PCT International Application No. PCT/KR2017/010185, International Search Report dated Apr. 27, 2018, 2 pages.

* cited by examiner

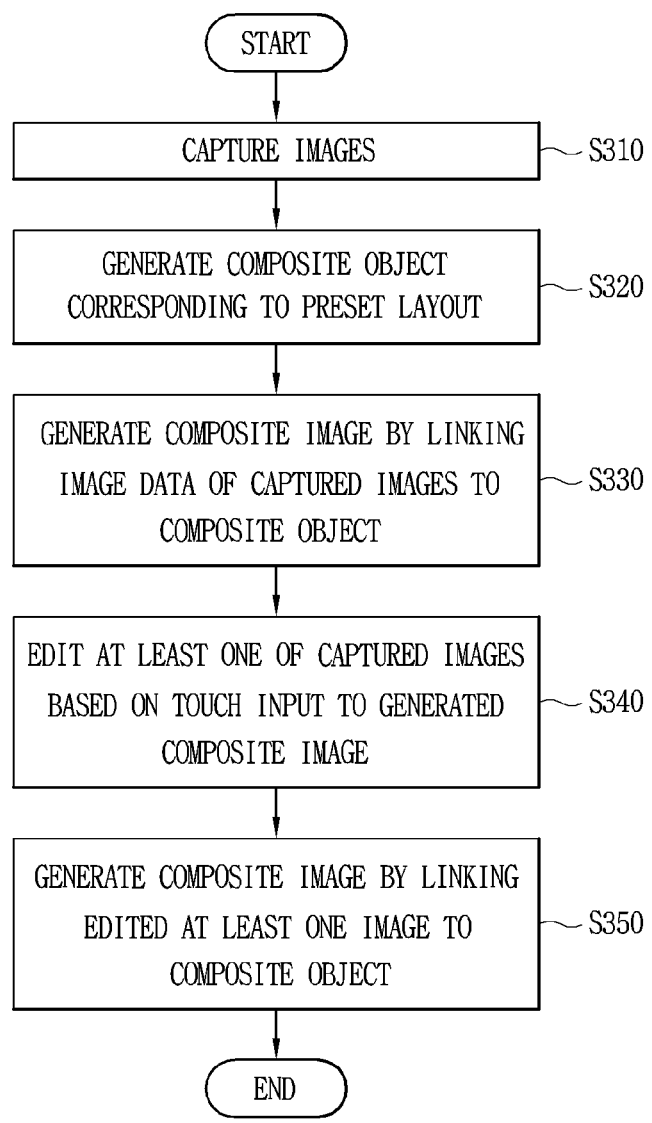

MOBILE TERMINAL AND CONTROL METHOD THEREOF

CROSS-REFERENCE TO RELATED APPLICATIONS

This application is the National Stage filing under 35 U.S.C. 371 of International Application No. PCT/KR2017/010185, filed on Sep. 18, 2017, which claims the benefit of earlier filing date and right of priority to Korean Application No. 10-2017-0097737, filed on Aug. 1, 2017, the contents of which are all hereby incorporated by reference herein in their entirety.

TECHNICAL FIELD

The present disclosure relates to a mobile terminal generating a composite image.

BACKGROUND ART

Terminals may be divided into mobile/portable terminals and stationary terminals according to mobility. Also, the mobile terminals may be classified into handheld types and vehicle mount types according to whether or not a user can directly carry.

Mobile terminals have become increasingly more functional. Examples of such functions include data and voice communications, capturing images and video via a camera, recording audio, playing music files via a speaker system, and displaying images and video on a display. Some mobile terminals include additional functionality which supports electronic game playing, while other terminals are configured as multimedia players. Specifically, in recent time, mobile terminals can receive broadcast and multicast signals to allow viewing of video or television programs As it becomes multifunctional, a mobile terminal can be allowed to capture still images or moving images, play music or video files, play games, receive broadcast and the like, so as to be implemented as an integrated multimedia player.

Efforts are ongoing to support and increase the functionality of mobile terminals. Such efforts include software and hardware improvements, as well as changes and improvements in the structural components.

Recently, with improvement of camera functions of mobile terminals, the needs of users who want to edit images captured by cameras of the mobile terminals in various forms are increasing.

However, since a process of re-editing a composite image generated after editing captured images is complicated, general users feel difficult to edit the image. Therefore, the present disclosure proposes a method of providing a convenient editing function for a composite image.

DISCLOSURE

Technical Problem

One aspect of the present disclosure is to easily edit a composite image.

Another aspect of the present disclosure is to control a plurality of moving images (or videos) included in a composite image.

Technical Solution

A mobile terminal according to one embodiment of the present disclosure may include a camera configured to capture images, a display having a first region to display a preview image received from the camera, and a second region to display the images captured through the camera in a preset layout, and a controller configured to generate a composite object corresponding to the preset layout based on a user control command for storing a composite image, and generate the composite image by linking image data of the captured images with the composite object so that the captured images are located at specific positions of the composite object. The controller may store the image data of the captured images together with the composite image.

In one embodiment disclosed herein, the controller may further generate linkage information between the composite object and the image data. The linkage information may include relative position information among the image data, and size information related to the image data.

In one embodiment disclosed herein, the controller may execute an edit mode when a preset touch is applied to the composite image, and change position information or size information of the linkage information based on a control command for changing the positions or sizes of the images forming the composite image in the edit mode.

In one embodiment disclosed herein, the controller may extract image data corresponding to a plurality of faces included in the preview image based on a face recognition algorithm, and process the extracted image data corresponding to the plurality of faces to be linked with the composite object.

In one embodiment disclosed herein, the controller may determine a layout of the composite object based on a number of persons indicated by the plurality of faces corresponding to the extracted image data.

In one embodiment disclosed herein, the controller may sequentially play back the captured images according to a trajectory of a touch input applied to the composite image when the captured images are moving images.

In one embodiment disclosed herein, the controller may sequentially play back the captured images based on an order in which the trajectory of the touch input is detected.

In one embodiment disclosed herein, the controller may sequentially play back the captured images based on a release of the touch input.

In one embodiment disclosed herein, the controller may control a volume of at least one of moving images included in the composite image based on a user control command when the captured images are the moving images.

In one embodiment disclosed herein, the controller may mute the at least one moving image, in response to a touch input being applied to the at least one moving image while the moving images included in the composite image are being played back simultaneously.

In one embodiment disclosed herein, the controller may change audio data of at least one of moving images included in the composite image into prestored audio data, based on a user control command, when the captured images are the moving images.

In one embodiment disclosed herein, the controller may output an audio list indicating the prestored audio data based on a user control command for changing audio data.

In one embodiment disclosed herein, the controller may control the camera to capture a new image to be merged at a position where a specific image has been displayed, in response to a touch input being applied to the specific image among the captured images.

In one embodiment disclosed herein, the controller may display the captured new image at the position where the specific image has been displayed when the new image is captured through the camera.

In one embodiment disclosed herein, the image data of each of the captured images may have a different data format.

Advantageous Effects

A mobile terminal according to the present disclosure can store a composite image together with original data of a plurality of images when generating the composite image by using the plurality of images, so that the composite image can be edited using the original data of the plurality of images. This may allow the composite image to be more easily edited after the generation of the composite image.

In addition, when a plurality of moving images is merged, the plurality of moving images can be simultaneously or sequentially played back based on a user's touch input with respect to the composite image.

BRIEF DESCRIPTION OF THE DRAWINGS

FIGS. 1B and 10 are perspective views of a mobile terminal associated with the present disclosure.

FIG. 3 is a flowchart illustrating a control method of editing a composite image in a mobile terminal according to the present disclosure.

BEST MODE FOR CARRYING OUT PREFERRED EMBODIMENTS

Figure 1A:
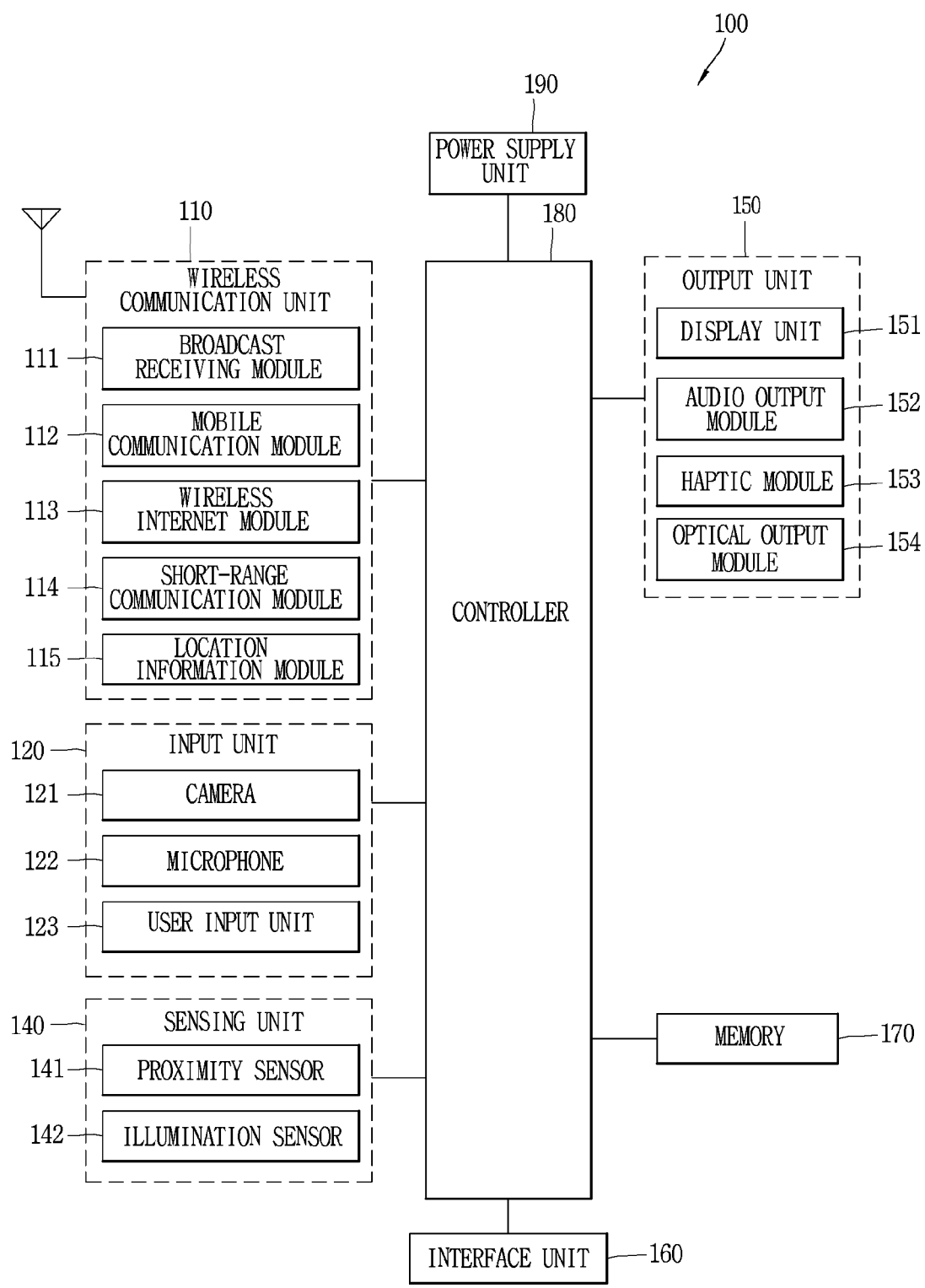
FIG. 1A is a block diagram of a mobile terminal in accordance with one implementation of the present disclosure.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Electronic devices presented herein may be implemented using a variety of different types of terminals. Examples of such devices include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
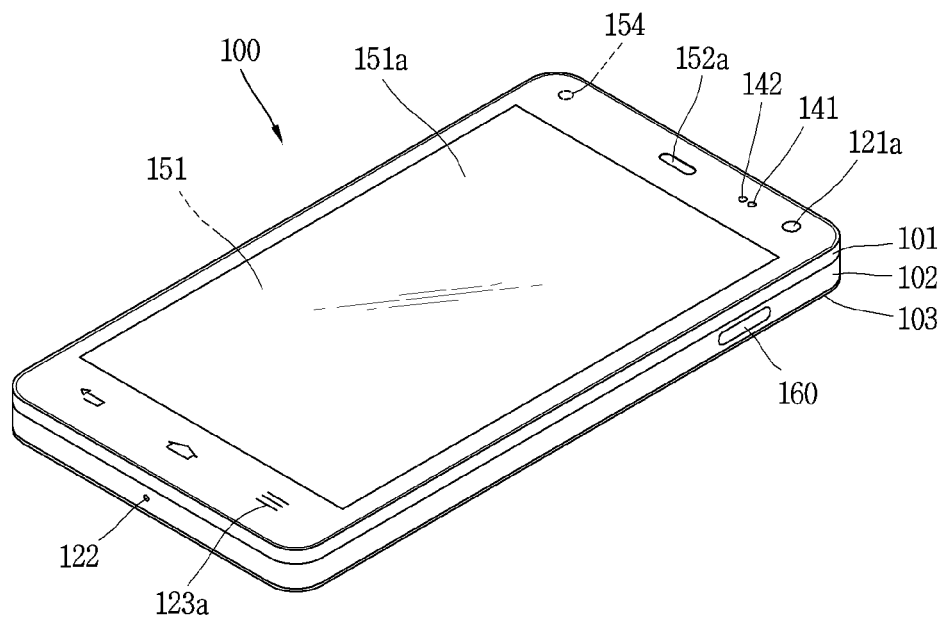
Figure 1C:
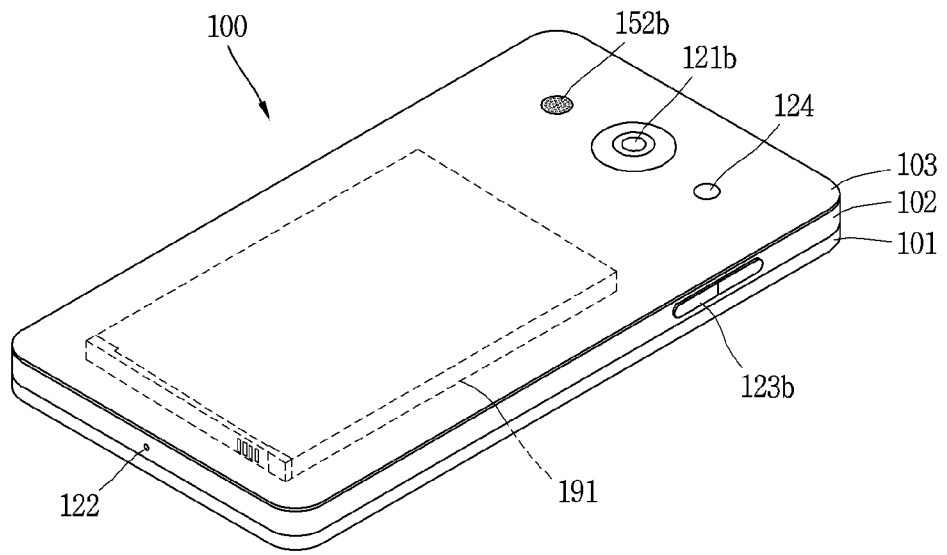

FIG. 1 is a block diagram of a portable electronic device in accordance with the present disclosure. Referring to FIG. 1, the portable electronic device 100 may be shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement. Greater or fewer components may alternatively be implemented.

In more detail, the wireless communication unit 110 may typically include one or more modules which permit communications such as wireless communications between the portable electronic device 100 and a wireless communication system, communications between the portable electronic device 100 and another portable electronic device, or communications between the portable electronic device 100 and an external server. Further, the wireless communication unit 110 may typically include one or more modules which connect the portable electronic device 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the portable electronic device, the surrounding environment of the portable electronic device, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The portable electronic device disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display 151, an audio output module 152, a haptic module 153, and an optical output module 154. The display 151 may have an inter-layered structure or an integrated structure with a touch sensor in order to implement a touch screen. The touch screen may function as the user input unit 123 which provides an input interface between the portable electronic device 100 and the user and simultaneously provide an output interface between the portable electronic device 100 and a user.

The interface unit 160 serves as an interface with various types of external devices that are coupled to the portable electronic device 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the portable electronic device 100 may perform assorted control functions associated with a connected external device, in response to the external device being connected to the interface unit 160.

The memory 170 is typically implemented to store data to support various functions or features of the portable electronic device 100. For instance, the memory 170 may be configured to store application programs executed in the portable electronic device 100, data or instructions for operations of the portable electronic device 100, and the like. Some of these application programs may be downloaded from an external server via wireless communication. Other application programs may be installed within the portable electronic device 100 at the time of manufacturing or shipping, which is typically the case for basic functions of the portable electronic device 100 (for example, receiving a call, placing a call, receiving a message, sending a message, and the like). Application programs may be stored in the memory 170, installed in the portable electronic device 100, and executed by the controller 180 to perform an operation (or function) for the portable electronic device 100.

The controller 180 typically functions to control an overall operation of the portable electronic device 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 may control at least some of the components illustrated in FIG. 1, to execute an application program that have been stored in the memory 170. In addition, the controller 180 may control at least two of those components included in the portable electronic device 100 to activate the application program.

The power supply unit 190 may be configured to receive external power or provide internal power in order to supply appropriate power required for operating elements and components included in the portable electronic device 100. The power supply unit 190 may include a battery, and the battery may be configured to be embedded in the terminal body, or configured to be detachable from the terminal body.

At least part of the components may cooperatively operate to implement an operation, a control or a control method of a portable electronic device according to various embodiments disclosed herein. Also, the operation, the control or the control method of the portable electronic device may be implemented on the portable electronic device by an activation of at least one application program stored in the memory 170.

Hereinafter, description will be given in more detail of the aforementioned components with reference to FIG. 1, prior to describing various embodiments implemented through the portable electronic device 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules may be utilized to facilitate simultaneous reception of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

The wireless signal may include various types of data depending on a voice call signal, a video call signal, or a text/multimedia message transmission/reception.

The wireless Internet module 113 refers to a module for wireless Internet access. This module may be internally or externally coupled to the portable electronic device 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

When the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the portable electronic device 100 and a wireless communication system, communications between the portable electronic device 100 and another portable electronic device 100, or communications between the portable electronic device and a network where another portable electronic device 100 (or an external server) is located, via wireless area networks. One example of the wireless area networks is a wireless personal area network.

Here, another portable electronic device (which may be configured similarly to portable electronic device 100) may be a wearable device, for example, a smart watch, a smart glass or a head mounted display (HMD), which is able to exchange data with the portable electronic device 100 (or otherwise cooperate with the portable electronic device 100). The short-range communication module 114 may sense or recognize the portable electronic device, and permit communication between the wearable device and the portable electronic device 100. In addition, when the sensed portable electronic device is a device which is authenticated to communicate with the electronic device 100, the controller 180, for example, may cause transmission of at least part of data processed in the portable electronic device 100 to the portable electronic device via the short-range communication module 114. Hence, a user of the portable electronic device may use the data processed in the portable electronic device 100 on the portable electronic device. For example, when a call is received in the portable electronic device 100, the user may answer the call using the portable electronic device. Also, when a message is received in the portable electronic device 100, the user can check the received message using the portable electronic device.

The location information module 115 is generally configured to detect, calculate, derive or otherwise identify a position (or current position) of the portable electronic device. As an example, the location information module 115 includes a Global Position System (GPS) module, a Wi-Fi module, or both. For example, when the portable electronic device uses a GPS module, a position of the portable electronic device may be acquired using a signal sent from a GPS satellite. As another example, when the portable electronic device uses the Wi-Fi module, a position of the portable electronic device can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the portable electronic device. The location information module 115 is a module used for acquiring the position (or the current position) and may not be limited to a module for directly calculating or acquiring the position of the portable electronic device.

Next, the input unit 120 is configured to permit various types of inputs to the portable electronic device 100. Examples of such inputs include image information (or signal), audio information (or signal), data or various information input by a user, and may be provided with one or a plurality of cameras 121. Such cameras 121 may process image frames of still pictures or video obtained by image sensors in a video or image capture mode. The processed image frames can be displayed on the display 151 or stored in memory 170. Meanwhile, the cameras 121 may be arranged in a matrix configuration to permit a plurality of images having various angles or focal points to be input to the portable electronic device 100, and a plurality of image information having various angles or focal points may be input in the portable electronic device 100 through the cameras 121 having the matrix configuration. Also, the cameras 121 may be located in a stereoscopic arrangement to acquire left and right images for implementing a stereoscopic image.

The microphone 122 processes an external audio signal into electric audio (sound) data. The processed audio data may be processed in various manners according to a function (or application program) being executed in the portable electronic device 100. If desired, the microphone 122 may include assorted noise removing algorithms to remove unwanted noise generated in the course of receiving the external audio signal.

The user input unit 123 is a component that permits input by a user. Such user input may enable the controller 180 to control an operation of the portable electronic device 100 to correspond to input information. The user input unit 123 may include one or more of a mechanical input element (for example, a mechanical key, a button located on a front and/or rear surface or a side surface of the portable electronic device 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the electronic device at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the portable electronic device, surrounding environment information of the portable electronic device, user information, or the like, and generate a corresponding sensing signal. The controller 180 generally cooperates with the sending unit 140 to control operations of the portable electronic device 100 or execute data processing, a function or an operation associated with an application program installed in the portable electronic device 100 based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner area of the portable electronic device covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared ray proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 may control the portable electronic device 100 to execute different operations or process different data (or information) according to whether a touch with respect to a point on the touch screen is either a proximity touch or a contact touch.

A touch sensor can sense a touch (or a touch input) applied to the touch screen, such as display 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display 151, or convert capacitance occurring at a specific part of the display 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which area of the display 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the portable electronic device 100 or a currently executed application program, for example.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors (TRs) at rows and columns to scan content received at the photo sensor using an electrical signal which changes according to the quantity of applied light. Namely, the photo sensor may calculate the coordinates of the physical object according to variation of light to thus obtain location information of the physical object.

The display 151 is generally configured to output information processed in the portable electronic device 100. For example, the display 151 may display execution screen information of an application program executing at the portable electronic device 100 or user interface (UI) and graphic user interface (GUI) information in response to the execution screen information.

Also, the display 151 may be implemented as a stereoscopic display for displaying stereoscopic images.

A typical stereoscopic display may employ a stereoscopic display scheme such as a stereoscopic scheme (a glass scheme), an auto-stereoscopic scheme (glassless scheme), a projection scheme (holographic scheme), or the like.

The audio output module 152 may receive audio data from the wireless communication unit 110 or output audio data stored in the memory 170 during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the portable electronic device 100. The audio output module 152 may also be implemented as a receiver, a speaker, a buzzer, or the like.

A haptic module 153 can be configured to generate various tactile effects that a user feels, perceives, or otherwise experiences. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the portable electronic device 100.

An optical output module 154 can output a signal for indicating an event generation using light of a light source. Examples of events generated in the portable electronic device 100 may include message reception, call signal reception, a missed call, an alarm, a schedule notice, an email reception, information reception through an application, and the like.

A signal output by the optical output module 154 may be implemented in such a manner that the portable electronic device emits monochromatic light or light with a plurality of colors. The signal output may be terminated as the portable electronic device senses that a user has checked the generated event, for example.

The interface unit 160 serves as an interface for every external device to be connected with the portable electronic device 100. For example, the interface unit 160 can receive data transmitted from an external device, receive power to transfer to elements and components within the portable electronic device 100, or transmit internal data of the portable electronic device 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the portable electronic device 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the portable electronic device 100 is connected with an external cradle, the interface unit 160 can serve as a passage to allow power from the cradle to be supplied to the portable electronic device 100 or may serve as a passage to allow various command signals input by the user from the cradle to be transferred to the portable electronic device therethrough. Various command signals or power input from the cradle may operate as signals for recognizing that the portable electronic device 100 is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The portable electronic device 100 may also be operated in relation to a network storage device that performs the storage function of the memory 170 over a network, such as the Internet.

The controller 180 may typically control operations relating to application programs and the general operations of the portable electronic device 100. For example, the controller 180 may set or release a lock state for restricting a user from inputting a control command with respect to applications when a status of the portable electronic device meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 may control one or a combination of those components in order to implement various exemplary embodiments disclosed herein on the portable electronic device 100 according to the present disclosure.

The power supply unit 190 receives external power or provides internal power and supply the appropriate power required for operating respective elements and components included in the portable electronic device 100 under the control of the controller 180. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

The mobile terminal according to the present disclosure may generate various types of composite images (merged images or synthesized images) through various camera capturing or photographing modes. Hereinafter, the camera capturing modes of the present disclosure will be described with reference to FIGS. 2A to 2D.

First, the controller or control unit 180 of the mobile terminal according to the present disclosure may execute various capturing or photographing modes for generating a composite image based on a user request. The capturing modes may include a grid shot mode for combining or merging four images into a grid form, a match shot mode for merging two images, a snap shot mode for simultaneously outputting a preview image and an image photographed or captured by a camera, and a guide shot mode for providing a guide image to guide a composition of a photo or image.

Hereinafter, the present disclosure will be described in more detail with reference to the accompanying drawings. When a camera application is executed, the controller 180 may display a preview image received through the camera 121 on the display 151. The preview image is an image received through the camera 121 before capturing an image.

The controller 180 may execute a grid shot mode based on a user control command while the camera application is executed. The grid shot mode is a mode for providing an image capturing function while showing in advance a form of a composite image (a synthesized image or a merged image).

Figure 2A:
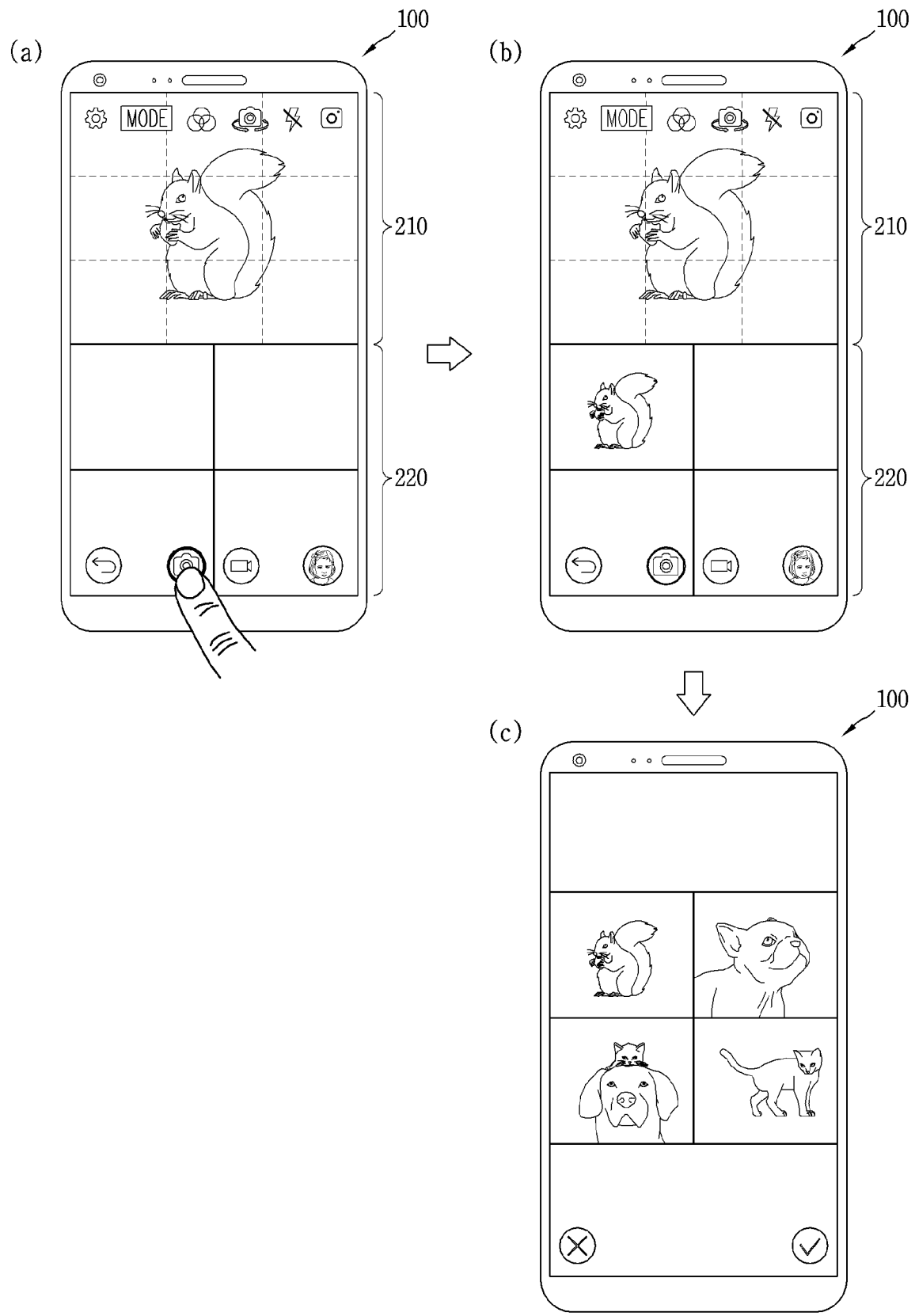
FIGS. 2A to 2D are conceptual views illustrating a camera execution mode in a mobile terminal according to the present disclosure.

Referring to (a) of FIG. 2A, when a grid shot mode is executed, the controller 180 may divide the display 151 displaying the preview image into a plurality of regions. More specifically, the controller 180 may divide an output region of the display 151 into a first region 210 in which the preview image is displayed and a second region 220 in which a preset layout is displayed. The preset layout is screen information indicating an arrangement of images in a grid shape. For example, referring to (a) of FIG. 2A, the preset layout has a quadrangular shape divided into four regions.

Referring to (b) of FIG. 2A, when an image is captured based on a capture command, the controller 180 may display the captured image in the second region.

More specifically, the controller 180 may sequentially display captured images in a clockwise direction from an upper-left region, according to a captured order of the images. For example, as illustrated in (b) of FIG. 2A, a captured image may be displayed in an upper-left region of the second region.

As illustrated in (c) of FIG. 2A, when images are completely captured, the controller 180 may generate a composite image by merging (combining or synthesizing) the images into a layout form displayed in the second region. Therefore, the user can check in advance a form of the composite image in a preview manner before the merging (synthesis) of the images.

Although not shown, the controller 180 may perform re-capturing based on a touch input applied to the images displayed in the second region. In this instance, the controller 180 may delete an image displayed on a region, to which a touch input has been applied among a plurality of images displayed in the second region, from the memory 170 and then display a re-captured image on the region to which the touch input has been applied. Therefore, when capturing images for generating a composite image, the user can immediately re-capture a wrongly-captured image.

Next, the controller 180 may execute a snap shot mode based on a user control command while the camera application is executed. The snap shot mode is a mode in which a user can directly view an image captured through a camera.

Figure 2B:
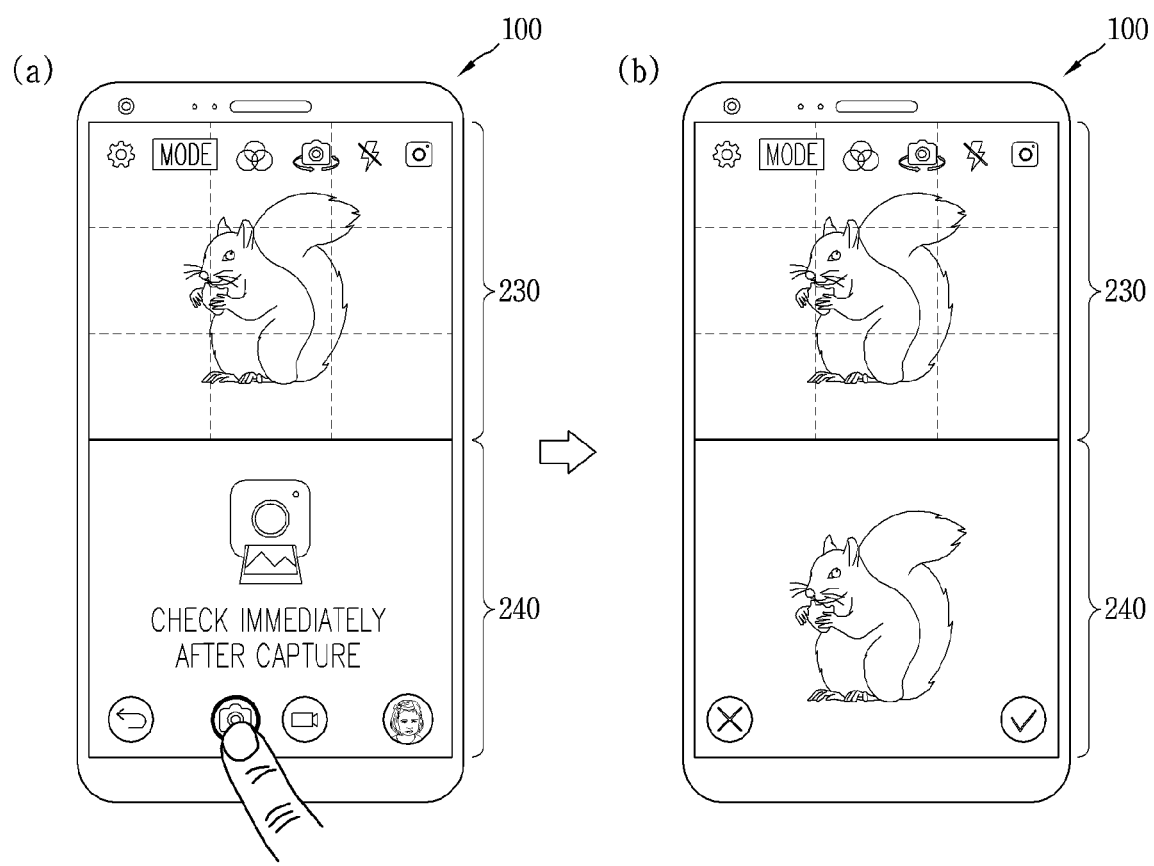
Figure 2C:
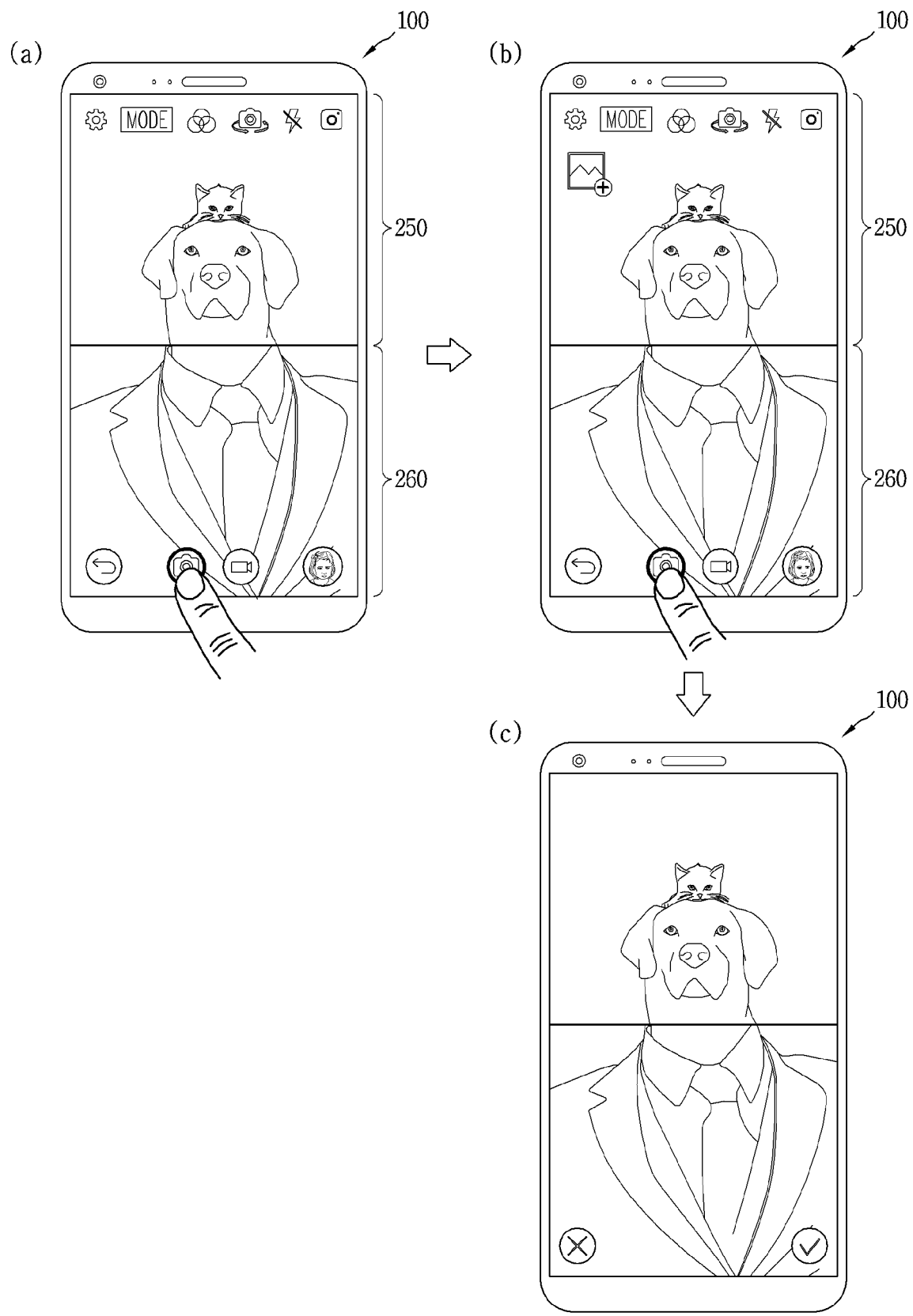

Referring to (a) of FIG. 2B, when a snap shot mode is executed, the controller 180 may divide the display 151 into a first region 230 for displaying a preview image, and a second region 240 for displaying an image stored in the memory 170.

Referring to (b) of FIG. 2B, the second region 240 may display not only an image stored in the memory 170 but also an image which has been captured just before. Therefore, the user can immediately check a captured image as soon as the image is captured.

In addition, although not shown, the controller 180 may sequentially output images stored in the memory 170 based on a touch input applied to the second region 240. Accordingly, the user can check an image stored in the memory 170 while capturing an image through the camera 121.

When the capturing of the image is completed, the controller 180 may generate a composite image obtained by merging an image displayed on the first region 230 and an image displayed on the second region 240.

Next, the controller 180 may execute a match shot mode based on a user control command while the camera application is executed. The match shot mode is a mode in which different preview images are displayed in divided regions, respectively, and captured images are merged or synthesized.

The controller 180 may divide the display 151 into a plurality of regions on which preview images received from different cameras are displayed, respectively. For example, as illustrated in (a) of FIG. 2C, the controller 180 may divide the display 151 into a first region 250 for displaying a preview image received from a front camera 121*a* and a second region 260 for displaying a preview image received from a rear camera 121*b*.

Although not shown, a preview image received from the same camera may alternatively be displayed in both the first region 250 and the second region 260. This may depend on a user's selection.

The controller 180 may capture images simultaneously or sequentially through the different cameras based on a capture command. For example, as illustrated in (b) of FIG. 2C, the controller 180 may capture an image through the front camera 121*a* when a capture command is applied. And, as illustrated in (c) of FIG. 2C, the controller 180 may capture an image through the rear camera 121*b* when a capture command is applied, in a state where the image has been captured through the front camera 121*a*. Alternatively, although not shown, the controller 180 may simultaneously capture images through the front camera 121*a* and the rear camera 121*b*, in response to a single capture command being applied.

When capturing of the images is completed, the controller 180 may generate a composite image by merging the captured images. The composite image may have a form in which the display is divided.

Next, the controller 180 may execute a guide shot mode based on a user control command while the camera application is executed. The guide shot mode is a mode in which a guide image is output to overlap a preview image so that a photo or picture can be taken according to a preset composition.

Figure 2D:
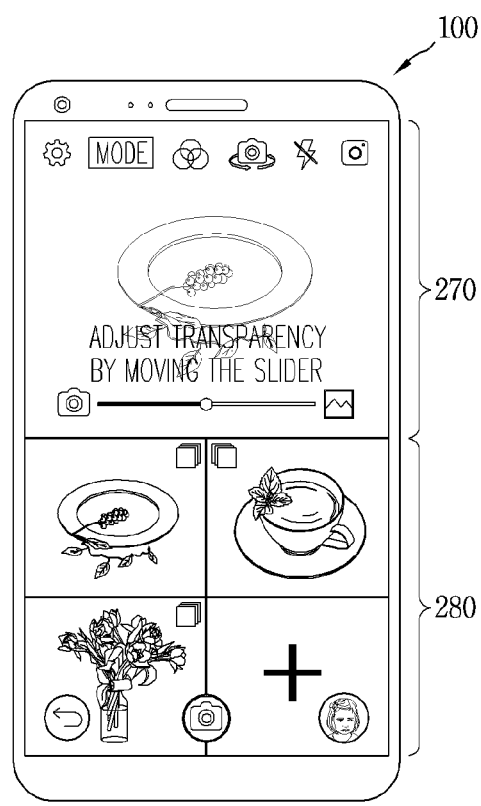

Referring to (a) of FIG. 2D, the controller 180 may divide the display 151 into a first region 270 for outputting a preview image, and a second region 280 for outputting images indicating different compositions. When a touch input is applied to any one of the images indicating the different compositions, the controller 180 may output a guide image corresponding to the one image in a manner of overlapping the preview image. In addition, the controller 180 may output the preview image and the guide image in an appropriate form by adjusting transparency of the guide image. Accordingly, the user can more easily capture an image with a desired composition by virtue of the guide image.

The foregoing description has been given of such various capturing modes associated with capturing through the camera in the mobile terminal according to the present disclosure.

Hereinafter, description will be given of a file format of a composite image obtained by merging images captured in those capturing modes, and a method of editing the composite image.

Figure 4:
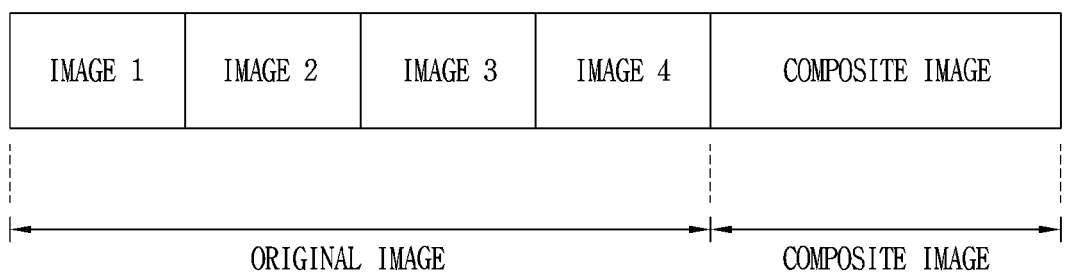
FIG. 4 is a conceptual view illustrating a storage form of a composite image.

FIG. 3 is a flowchart illustrating a control method of editing a composite image in a mobile terminal according to the present disclosure. FIG. 4 is a conceptual view illustrating a storage form of a composite image.

Figure 5:
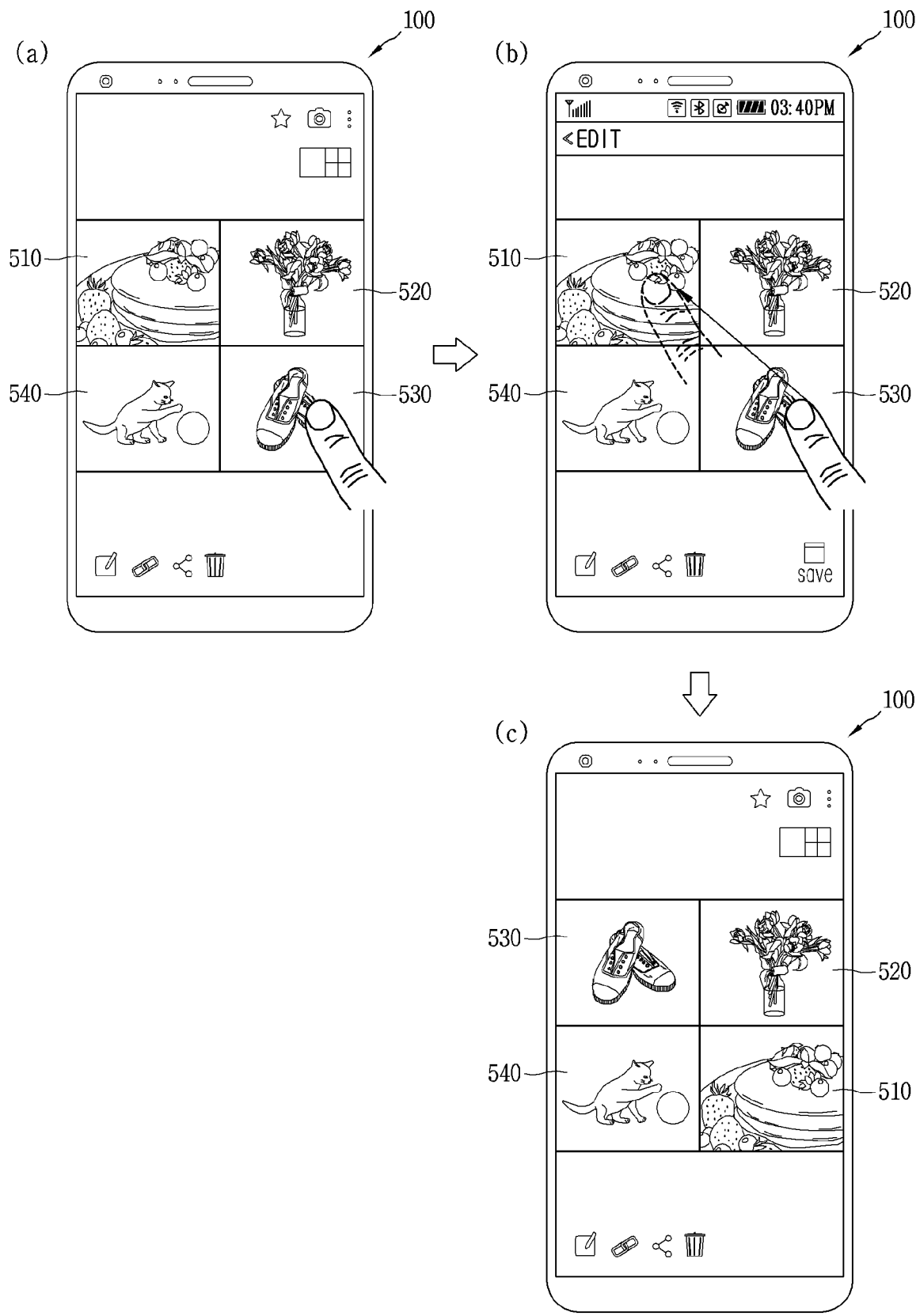
FIG. 5 is a conceptual view illustrating the control method of FIG. 3.

FIGS. 4 and 5 are conceptual views of the control method of FIG. 3.

Referring to FIG. 3, the controller 180 of the mobile terminal according to the present disclosure may capture images through a camera 121 (S310).

The camera 121 may include a single camera or a plurality of cameras. The images may be at least one image.

The controller 180 may execute a camera application in any one of a grid shot mode, a snap shot mode, a match shot mode, and a guide shot mode, based on a user control command. In the following drawings, it is assumed that the grid shot mode is executed unless otherwise stated. However, the present disclosure is not limited to the grid shot mode, but may be applied to generation of a composite image in the same manner in the snap shot mode, the match shot mode, and the guide shot mode.

The controller 180 may capture images through the camera 121 based on a capture command while the one mode is executed. The capture command may be input by various input methods such as voice input, touch input, and button input.

The controller 180 may capture a moving image or video and a still image. The controller 180 may capture a moving image when a moving image capture command is applied. In addition, the controller 180 may capture a still image when a still image capture command is applied. This may be decided by a user's selection.

The controller 180 may generate the images in various file formats based on a user control command. When the image is a still image, the file format of the image may be GIF, PNG, TIFF, JPEC, BMP, JFIF, WEBO, ICO, PCX, SVG, or the like, for example. When the image is a moving image, the file format of the image may be AVI, WMV, MPEC1, MPEC2, MPEC4, 3GP, MKV, or the like.

The controller 180 may generate a composite image obtained by merging (combining or synthesizing) the captured images based on a user control command. Hereinafter, images to be combined or merged is also referred to as "original images" or "captured images".

The controller 180 may generate a composite object corresponding to a preset layout after capturing the images (S320).

The controller 180 may generate a composite object (or synthesized object) corresponding to a preset layout based on a user control command for generating a composite image (synthesized image or merged image) after images are captured. The preset layout indicates an arrangement of images to be merged. Therefore, the composite image may have a form of the preset layout. A layout may be variously set. For example, a layout may be set such that four images are arranged in a grid form, or may be set such that two images are connected vertically or horizontally.

The composite object is a virtual object for generating a composite image in the preset layout. The composite object may include preset arrangement information related to images according to the layout, and preset setting information related to sizes, playback times, file formats, and the like of the images. For example, the composite object may further include a JPEC HEADER value, a TAG value, an EXIF value, etc. When capturing of images for generating a composite image is completed, the controller 180 may generate a composite object for generating the composite image.

As illustrated in FIG. 4, the composite object may be generated in a form in which original data of the original images and image data of a final composite image are stored together based on the setting information preset in the composite object. Accordingly, the controller 180 may edit the composite image by using the original data of the images forming the composite image when the composite image is edited.

When the composite object is generated, the controller 180 may generate a composite image by linking image data of the captured images to the composite object (S330).

The controller 180 may link the image data of the original images to the arrangement information included in the composite object so that the original images can be arranged according to the arrangement information included in the generated composite object. For example, when a composite image is an image that is split into four regions and different images are arranged in the respective regions, the controller 180 may link image data of the different images to arranged positions of the four regions. When the image data and the arrangement information have been linked to each other, the controller 180 may further generate linkage information indicating the linkage between the image data and the arrangement information.

In addition, the controller 180 may link the image data of the original images to the size information such that sizes of the original images can be set according to the size information included in the generated composite object. In this instance, the controller 180 may set the size of each image based on the size information linked to the image data of each image. When the image data and the size information are linked to each other, the controller 180 may further generate linkage information indicating the linkage between the image data and the size information.

In addition, the controller 180 may convert a file format of the original images according to the file format included in the composite object. For example, when a file format of an original image is BMP and a file format included in the composite object is JPEC, the controller 180 may convert the file format of the original image from BMP to JPEC. As another example, when the original image is a moving image or video, the controller 180 may use a codec to convert a file format of the moving image. More specifically, in order to convert the file format of the moving image into the file format included in the composite object, the controller 180 may load frames of the moving image for each time stamp using the codec, and extract frames located at user-desired positions based on a time line. The controller 180 may change the file format of the moving image to the file format included in the composite object by using the extracted frames.

On the other hand, when the original image is a moving image, the controller 180 may load a video frame and an audio frame of the moving image and link the video frame and the audio frame to the composite object, respectively.

In addition, the controller 180 may enlarge or reduce an original image, in response to a touch input applied to a preview screen displayed on a second region for displaying a composite image, before combining images. In this instance, the controller 180 may generate a composite image in an enlarged or reduced state.

When the data linkage is completed, the controller 180 may generate a composite image corresponding to the composite object to which the image data of the images has been linked. More specifically, the controller 180 may generate an absolute path between the composite object and the original images based on the setting information preset in the composite object. The composite image may be generated by arranging original data of each image in an appropriate form based on the absolute path. The absolute path is information connecting between the composite image and the original data. Therefore, the controller 180 may edit the composite image by changing path information related to the absolute path included in the composite object.

After the composite image is generated, the controller 180 may edit at least one of the captured images based on a touch input to the composite image (S340).

The controller 180 may detect a preset type of touch input (preset touch input) applied to the composite image after the composite image is generated. In this instance, the controller 180 may execute an edit mode for editing the composite image. For example, as illustrated in (a) of FIG. 5, the controller 180 may execute an edit mode, in response to a long touch input being applied to the composite image.

The edit mode is a mode that provides functions related to editing of the composite image. For example, in the edit mode, i) a filter setting function for providing a visual effect of an image, ii) a function of changing an arrangement of a partial image included in an image, iii) a function of changing a size of an image, iv) a function of cropping a part of an image, and the like may be provided. Other various functions may be provided in relation to image editing.

As illustrated in (b) of FIG. 5, when the edit mode is executed, the controller 180 may output an execution screen of the edit mode. Graphic objects indicating the edit mode may be output in the execution screen of the edit mode.

The controller 180 may execute an editing function of the composite image, in response to a preset touch input being applied to the composite image while the edit mode is executed.

For example, the controller 180 may detect a drag input which starts at a third image 530 of first to fourth images 510, 520, 530, and 540 forming a composite image and ends at the first image 510. In this instance, as illustrated in (c) of FIG. 5, the controller 180 may generate a composite image in a form in which positions of the first image 510 and the third image 530 are switched to each other.

More specifically, when an editing command is received, the controller 180 may edit the composite image by using original data of the first to fourth images linked to the composite object corresponding to the composite image. For example, when the positions of the first image 510 and the third image 530 are switched to each other, the controller 180 may change arrangement information linked to image data of the first image 510 and image data of the third image 530, respectively. Therefore, the controller 180 can edit the first to fourth images 510 to 540 individually even after the composite image of the first to fourth images 510 to 540 is generated.

As described above, according to the present disclosure, when a composite image is generated, original data of images forming a composite image and image data of the composite image can be stored together by using a composite object. This may allow editing of the composite image using the original data when editing the composite image. Therefore, the present disclosure can edit sizes and positions of the original images included in the composite image even after the generation of the composite image.

Figure 6A:
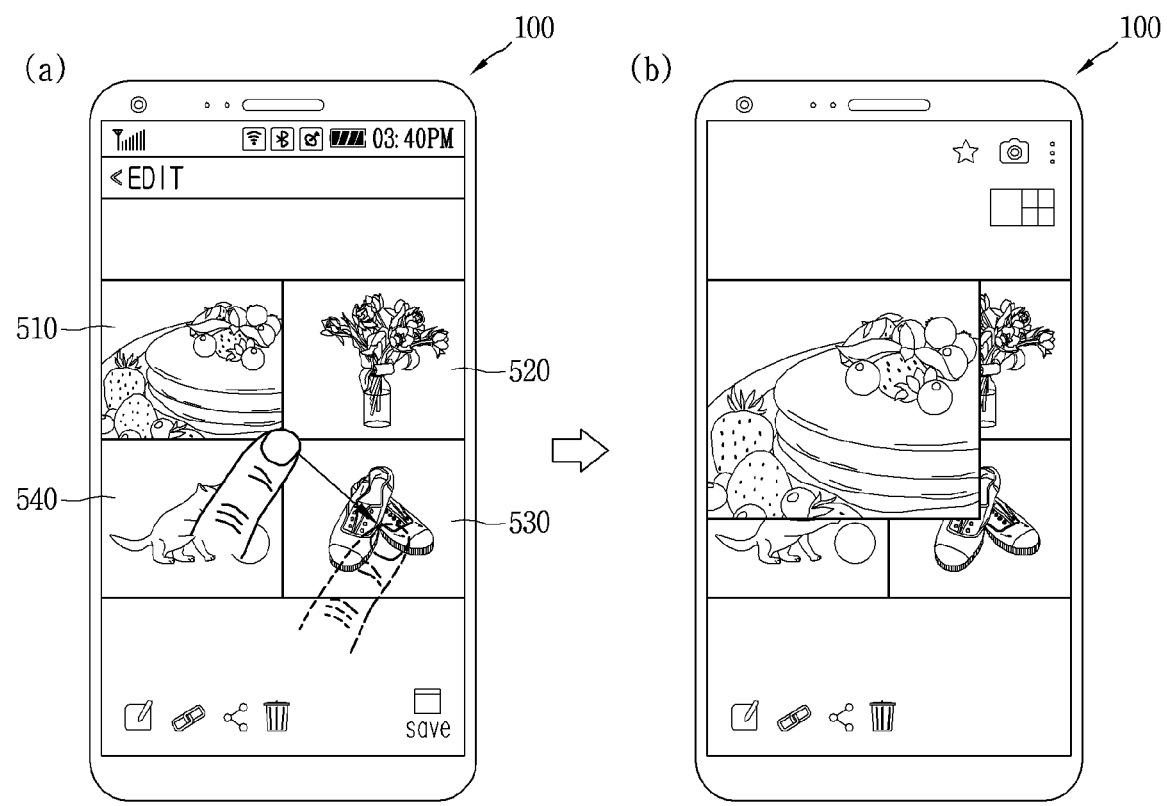
FIGS. 6A and 6B are conceptual views illustrating changing a size and a layout of a composite image.
Figure 6B:
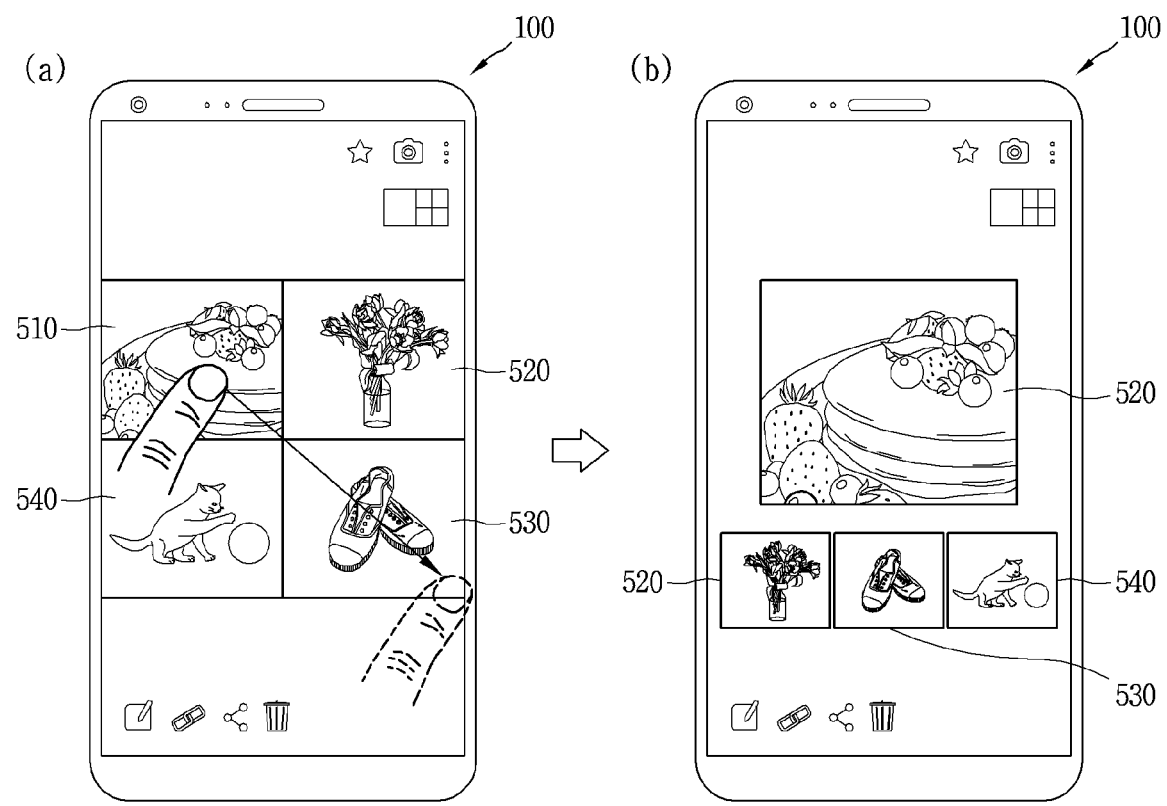

Hereinafter, a method of changing sizes of original images included in a composite image will be described. FIGS. 6A and 6B are conceptual views illustrating changing a size and a layout of a composite image.

Referring to (a) of FIG. 6A, the controller 180 may change a size of a first image 510, in response to a drag input starting from a boundary area of the first image 510. In this instance, the size of the first image 510 may be determined based on a dragged length of the drag input. For example, as illustrated in (b) of FIG. 6A, when a drag input applied in a first direction has a first length, the controller 180 may change the size of the first image 510 from a first size to a second size larger than the first size. As another example, when a drag input applied in a second direction opposite to the first direction has a second length, the controller 180 may change the size of the first image 510 from a first size to a second size smaller than the first size. In this instance, the controller 180 may re-link size information, which has been linked to the first image 510, to the changed size information.

Although the size of the first image is changed, the controller 180 may not change sizes of the second to fourth images 520 to 540. In this instance, a part of the first image 510 may be displayed to overlap parts of the second to fourth images 520 to 540.

Alternatively, although not shown, the controller 180 may change the sizes of the second to fourth images 520 to 540 in proportion to the change in the size of the first image. More specifically, when the size of the first image 510 is increased from a first size to a second size, the controller 180 may control the sizes of the second to fourth images to be reduced by a ratio that the size of the first image 510 is increased.

On the other hand, the controller 180 may change a layout of a composite image when a size of a specific original image among a plurality of original images included in the composite image is increased by a preset size or larger.

More specifically, referring to (a) and (b) of FIG. 6B, the controller 180 may change the layout of the composite image into a form illustrated in (b) of FIG. 6B, when the first image 510 among the first to fourth images 510 to 540 forming the composite image has a preset size or larger. Accordingly, the controller 180 can automatically provide a layout most suitable for each size of the images forming the composite image.

The foregoing description has been given of a method of adjusting sizes of original images forming a composite image and changing a layout of the composite image.

Figure 7A:
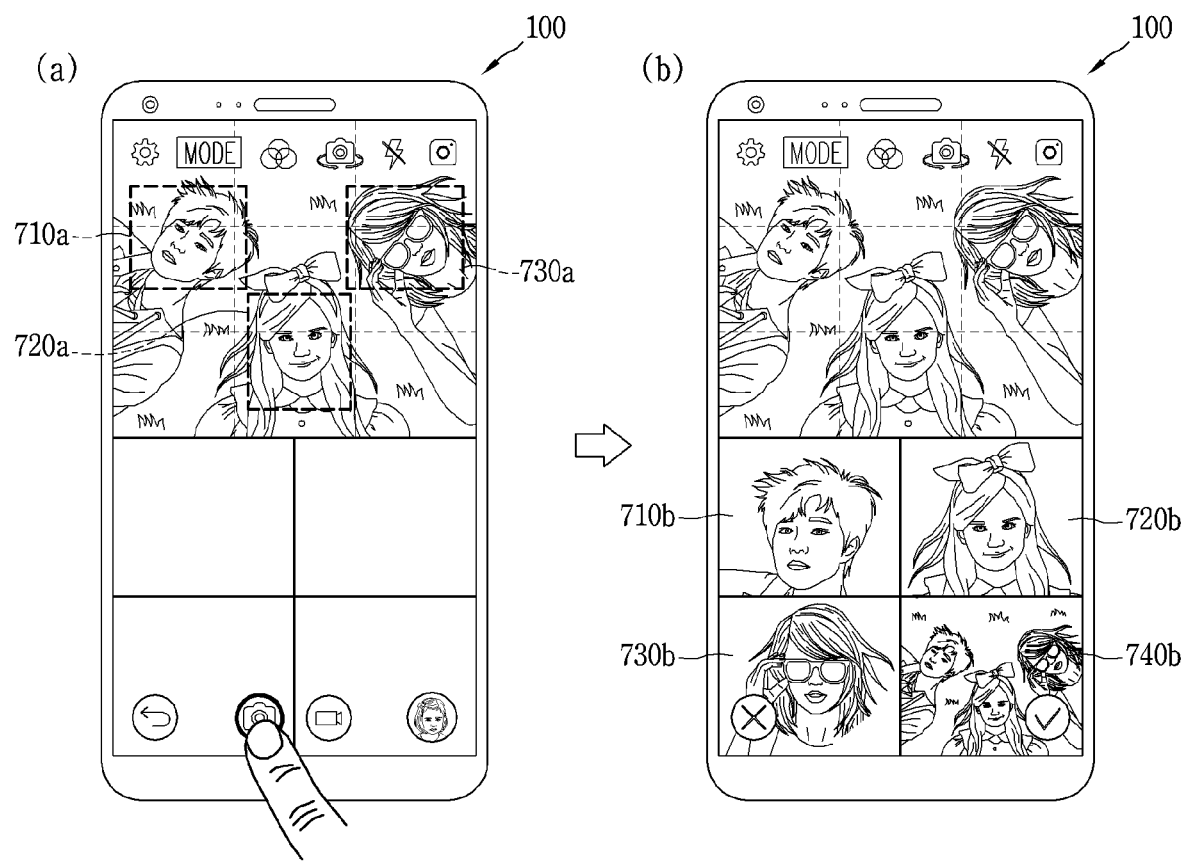
FIGS. 7A and 7B are conceptual views illustrating a method of generating a composite image by extracting faces included in a preview image.
Figure 7B:
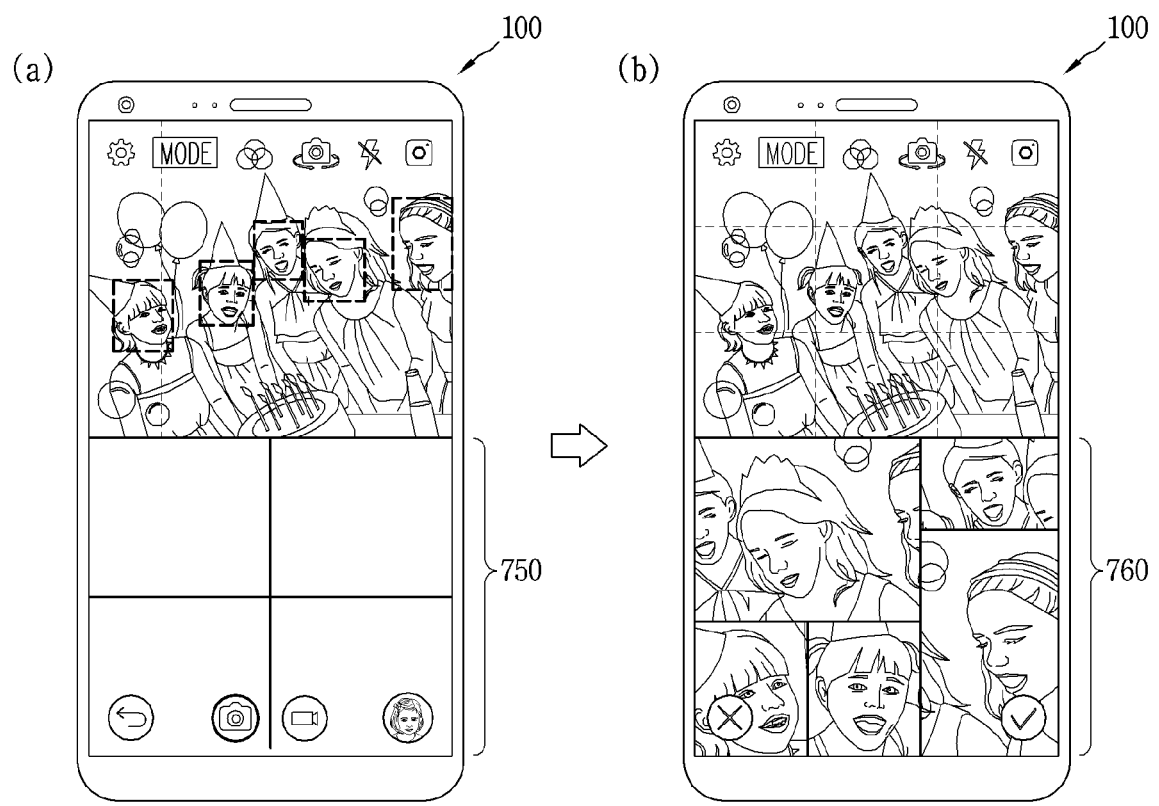

Hereinafter, a method of generating a composite image by recognizing or scanning a face of a subject to be captured will be described. FIGS. 7A and 7B are conceptual views illustrating a method of generating a composite image by recognizing a face of a subject to be captured.

The controller 180 may capture a subject based on a capture command applied. Meanwhile, as illustrated in (a) of FIG. 7A, when the subject is a person, the controller 180 may extract faces of persons from a preview image. More specifically, the controller 180 may extract image data 710a, 720a, and 730a corresponding to faces from a preview image by using a face recognition algorithm.

As illustrated in (b) of FIG. 7A, when a subject is captured based on a capture command, the controller 180 may generate partial images 710b, 720b, and 730b of the image data 710a, 720a, and 730a corresponding to the faces. The controller 180 may generate a composite image by using the partial images 710b, 720b and 730b and a captured image 740b of the subject. Therefore, when a group of people is captured, a full image for the group of people and partial images corresponding to faces of respective persons can simultaneously be obtained. In addition, the present disclosure may provide various types of composite images by including both the full image and the partial images in the composite image.

Meanwhile, when image data 710a, 720a, and 730a corresponding to first to third faces are extracted, the controller 180 may change a display direction of the image data so that the faces are displayed in a forward direction. Here, the forward direction is a direction in which eyes, nose, and mouth of a face are sequentially displayed in a direction of gravity. That is, when the first face 710a is in a state of being turned clockwise by 90 degrees with respect to the forward direction, the controller 180 may turn the first image 710b corresponding to the first face 710a counterclockwise by 90 degrees, thereby changing a display direction of the first image 710b to the forward direction. Therefore, the present disclosure can provide a facial image in a forward direction even when the user's face is captured in a direction different from the forward direction.

Although not shown, the controller 180 may alternatively change a display direction of image data corresponding to a face of a person, in response to a touch input in a preset direction being applied to an image corresponding to the face of the person. For example, when a touch input having a trajectory that draws a circle in a clockwise direction is applied to an image corresponding to a face, the controller 180 may turn the image corresponding to the face to a state of being turned clockwise by 90 degrees. Accordingly, the user can freely set display directions of original images to be merged into a composite image.

In addition, when a subject to be captured is a plurality of persons, the controller 180 may set a layout of a composite image according to the number of persons. For example, as illustrated in (b) of FIG. 7A, when the number of persons is three, the controller 180 may set a layout of a composite image to a 4-split layout. On the other hand, as illustrated in (a) and (b) of FIG. 7B, when the number of persons is five, the controller 180 may change the layout of the composite image from the 4-split layout 750 as a default to a 5-split layout 760.

The foregoing description has been given of a method of generating a composite image using a face of a subject to be captured. With this configuration, the present disclosure can capture an image including a group of people at the same time and also acquire a cropped image for only a face of each person. Furthermore, the present disclosure can give a visual fun to the user by generating one composite image using a cropped image for a face of each person and a full image.

Figure 8:
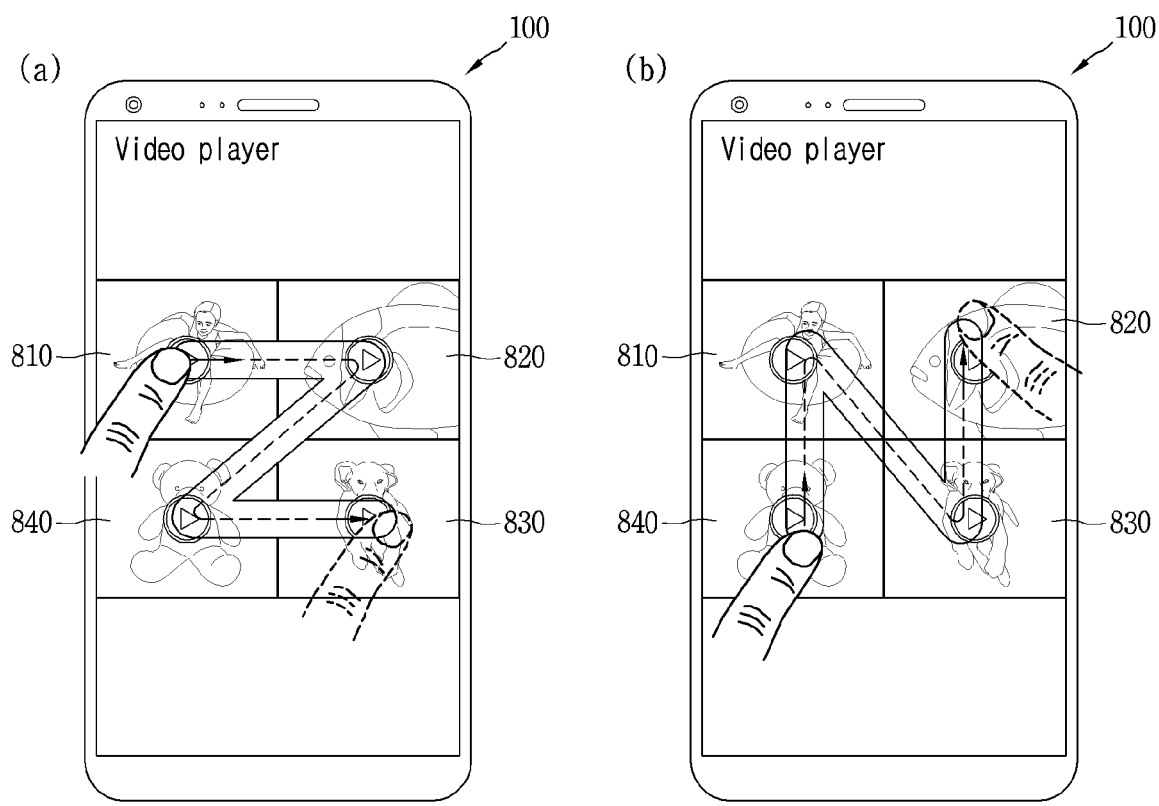
FIG. 8 is a conceptual view illustrating a method of setting a playback order of a plurality of moving images included in a composite image.

Hereinafter, a method of playing back original moving images or videos forming a composite image will be described. FIG. 8 is a conceptual view illustrating one embodiment of playing back original moving images forming a composite image.

As illustrated in (a) of FIG. 8, the controller 180 may capture a plurality of moving images based on a capture command, and then generate one composite image by using the captured plurality of moving images. In this instance, the controller 180 may sequentially or simultaneously play back the plurality of moving images included in the composite image based on a playback command.

For example, when a composite image including a plurality of moving images is displayed on the display 151, the controller 180 may display in one region an icon for simultaneously playing back the plurality of moving images. The controller 180 may simultaneously play back or simultaneously stop the playback of the plurality of moving images based on a touch input applied to the icon. Alternatively, the controller 180 may sequentially play back or stop the playback of the plurality of moving images based on a touch input applied to the icon. Whether to play back the moving images simultaneously or sequentially may be determined by a user's selection.

On the other hand, the controller 180 may determine a playback order of the plurality of moving images included in the composite image according to a trajectory of a touch input applied to the composite image. For example, referring to (a) of FIG. 8, the controller 180 may sequentially play back first to fourth moving images 810, 820, 830, and 840 in sequence of the first moving image 810→the second moving image 820→the fourth moving image 840→the third moving image 830, in response to a touch input in a Z-like shape being applied to the first to fourth moving images. That is, the playback order of the moving images may be determined according to the order in which the touch input is applied. As another example, referring to (b) of FIG. 8, the controller 180 may play back the moving images in sequence of the fourth moving image 840→the first moving image 810→the third moving image 830→the second moving image 820, in response to a touch input applied sequentially to the fourth moving image 840→the first moving image 810→the third moving image 830→the second moving image 820.

When the detection of the touch input is released, the controller 180 may play back the moving images sequentially. That is, the controller 180 may determine the playback order of the moving images according to a trajectory of a touch input until before the release of the touch input after the detection of the touch input, and may play back the moving images in response to the release of the touch input.

Although not shown, after detecting a touch input to the first and second moving images, among the first to fourth moving images 810 to 840 included in the composite image, when the touch input is released, the controller 180 may sequentially play back only the first and second moving images 810 and 820. Therefore, the present disclosure can selectively play back only some moving images included in the composite image. In addition, the user can play back the moving images by applying a touch input in a desired playback order.

The foregoing description has been given of a method of playing back a plurality of moving images included in a composite image. In this way, the user can play back the moving images included in the composite image in various forms.

Figure 9A:
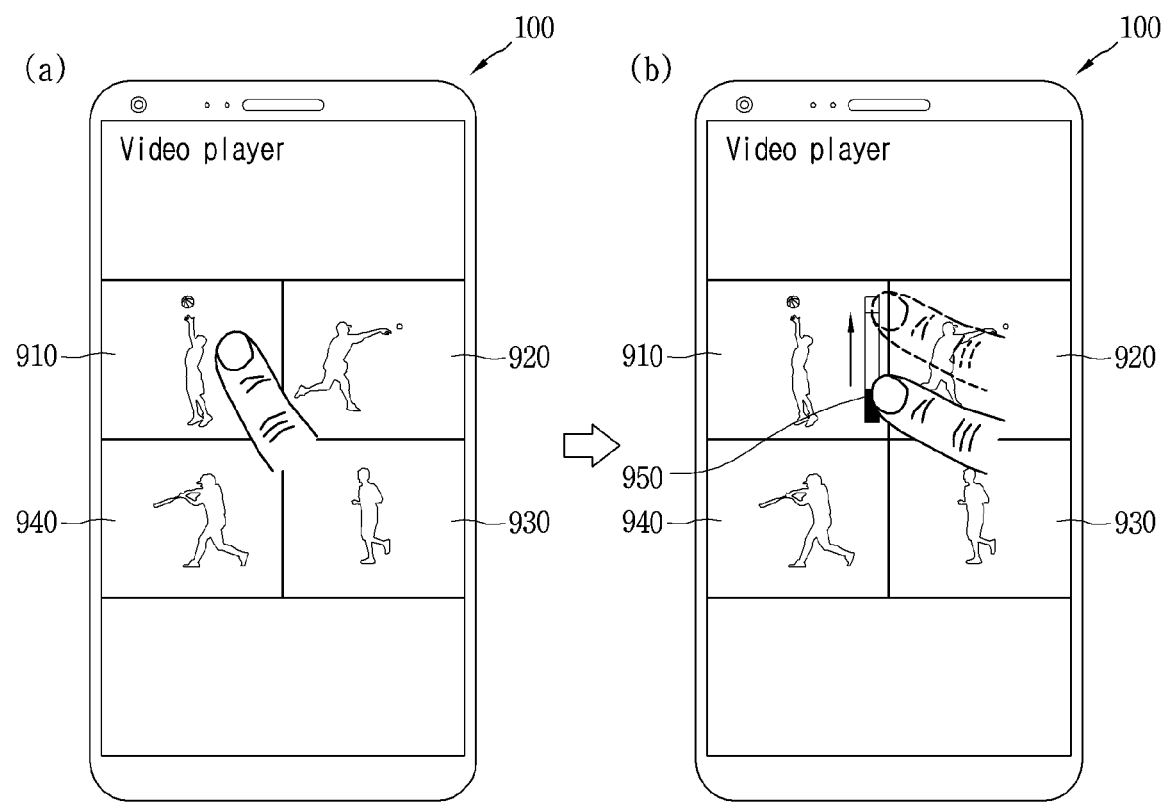
FIGS. 9A to 9C are conceptual views illustrating methods of controlling volumes of a plurality of moving images included in a composite image.
Figure 9B:
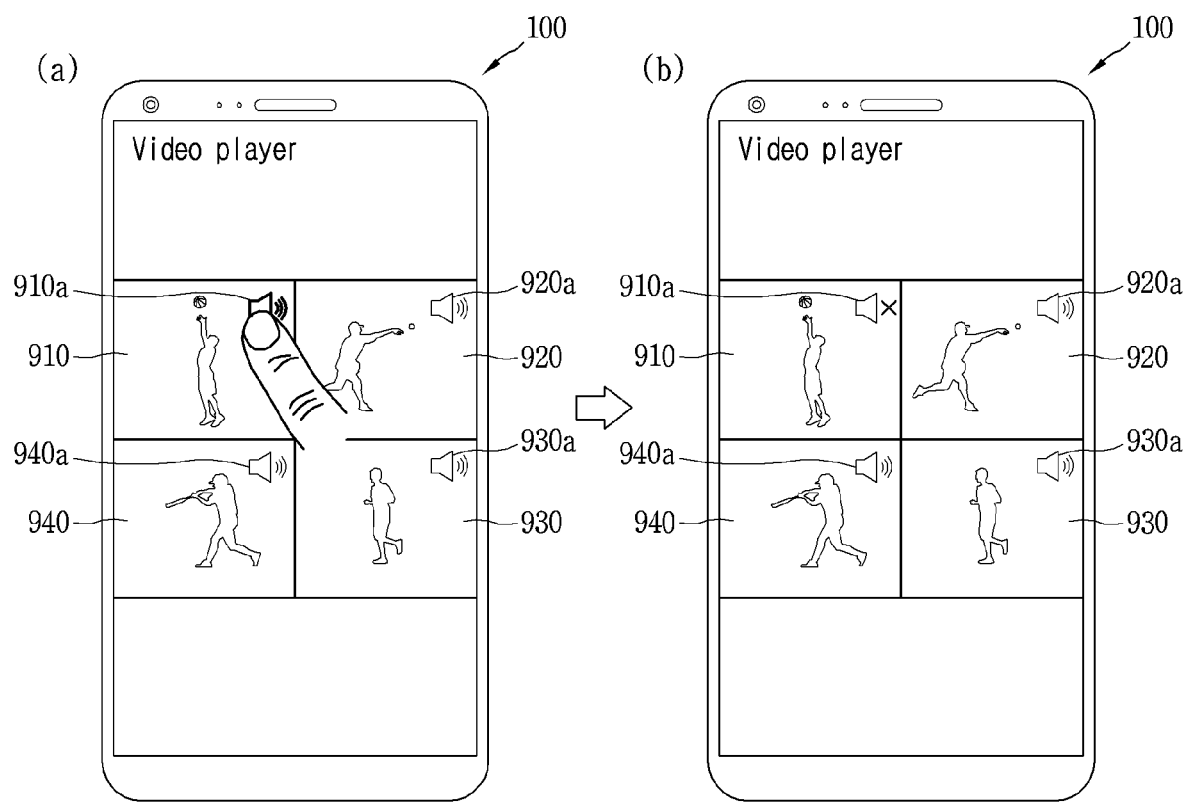
Figure 9C:
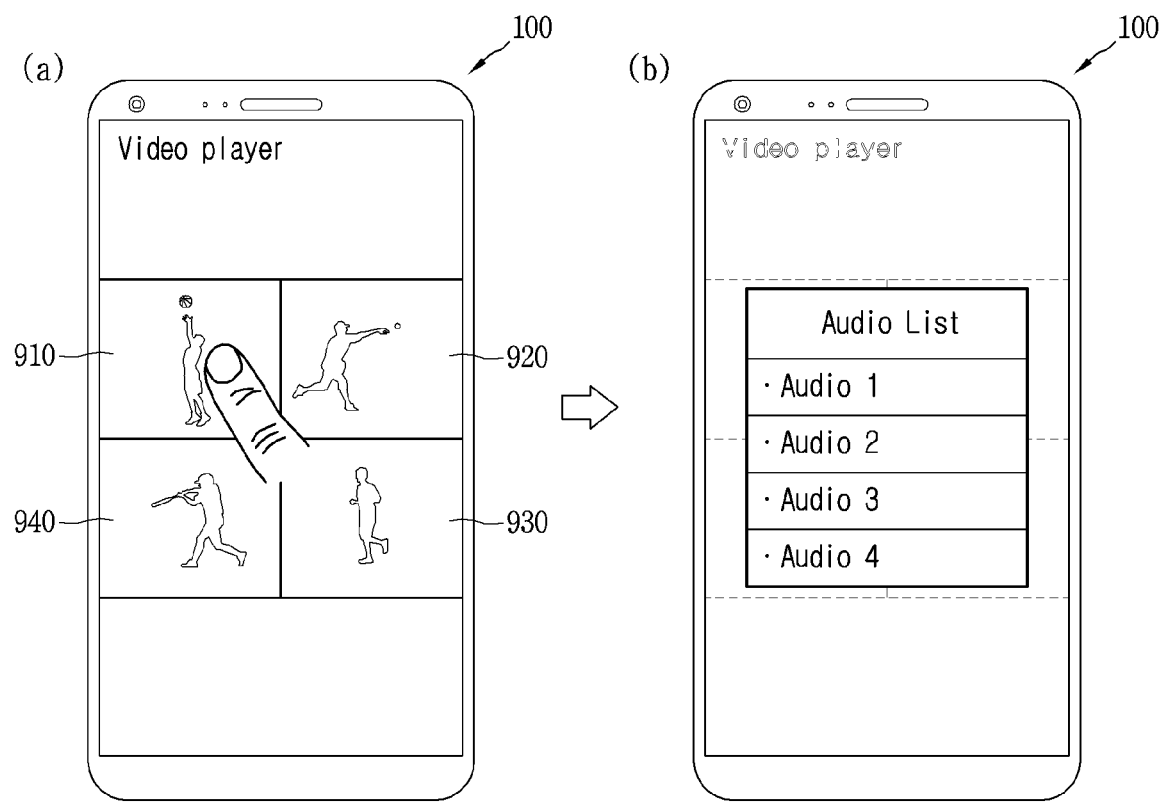

Hereinafter, a method of controlling volumes of a plurality of moving images included in a composite image will be described. FIGS. 9A to 9C are conceptual views illustrating methods of controlling volumes of a plurality of moving images included in a composite image.

As illustrated in (a) of FIG. 9A, the controller 180 may display a composite image including a plurality of moving images on the display 151. In this instance, the controller 180 may play back the plurality of moving images simultaneously or sequentially.

The controller 180 may control a volume of each moving image based on a user control command. For example, as illustrated in (a) of FIG. 9A, the controller 180 may output a graphic object 950 for controlling a volume, in response to a touch input applied to a first moving image 910. As illustrated in (b) of FIG. 9A, the controller 180 may control the audio volume of the first video 910 based on a touch input applied to the graphic object 950. That is, the controller 180 may individually control the volumes of the plurality of moving images included in the composite image.

In addition, the controller 180 may individually set a mute mode for the plurality of moving images. As illustrated in (a) of FIG. 9B, the controller 180 may display, in an overlapping manner, graphic objects 910a, 920a, 930a, and 940a for muting each of the plurality of moving images included in the composite image. In addition, the controller 180 may mute the audio volume of the first moving image 910, in response to a touch input applied to the graphic object 910a that is displayed to overlap the first moving image 910. As illustrated in (b) of FIG. 9B, when muting is executed, the controller 180 may change visual appearances of the graphic objects 910a, 920a, 930a, and 940a for execution of muting, to indicate that muting is being executed. In this way, the user can selectively listen to audio of some of the plurality of moving images.

In addition, the controller 180 may change audio data of at least one of the plurality of moving images included in the composite image into new audio data based on a user control command. Referring to (a) and (b) of FIG. 9C, the controller 180 may output an audio list including items corresponding to a plurality of audio data, in response to a long touch input applied to the first moving image 910 among the first to fourth moving images 910 to 940. The audio data included in the audio list is audio data stored in the memory 170 of the mobile terminal, and may also include the audio data of the second to fourth moving images 920 to 940.

When one of the plurality of audio data included in the audio list is selected, the controller 180 may change the audio data of the first moving image to the selected audio data. More specifically, the controller 180 may correspond (or match) video data of the first moving image to the selected audio data.

The foregoing description has been given of a method of controlling audio data of a plurality of moving images forming a composite image.

Hereinafter, an embodiment of editing images captured in a match shot mode will be described. FIGS. 10A to 10D are conceptual views illustrating embodiments of editing images captured in a match shot mode.

Figure 10A:
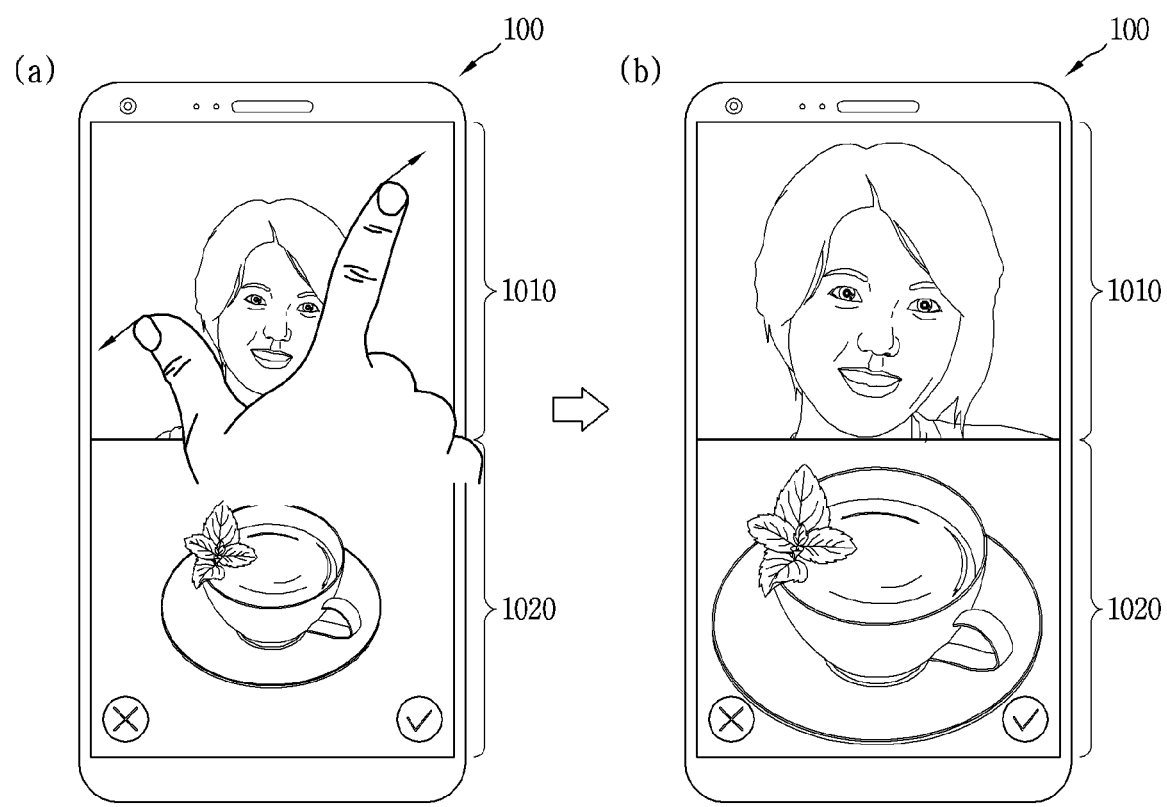
FIGS. 10A to 10D are conceptual views illustrating embodiments of editing a composite image.

Referring to (a) of FIG. 10A, the display 151 may display images captured in a match shot mode. More specifically, the display 151 may output different images on split first region 1010 and second region 1020. In this instance, as illustrated in (b) of FIG. 10A, the controller 180 may enlarge the image displayed on the first region 1010 based on a pinch-out input applied to the first region 1010. In addition, the controller 180 may enlarge the image displayed on the second region 1020 at the same ratio. That is, the controller 180 may enlarge the image displayed on the second region 1020 even if a pinch-out input is not applied to the second region 1020. In addition, the controller 180 may generate one composite image by merging the two images in the enlarged state.

Figure 10B:
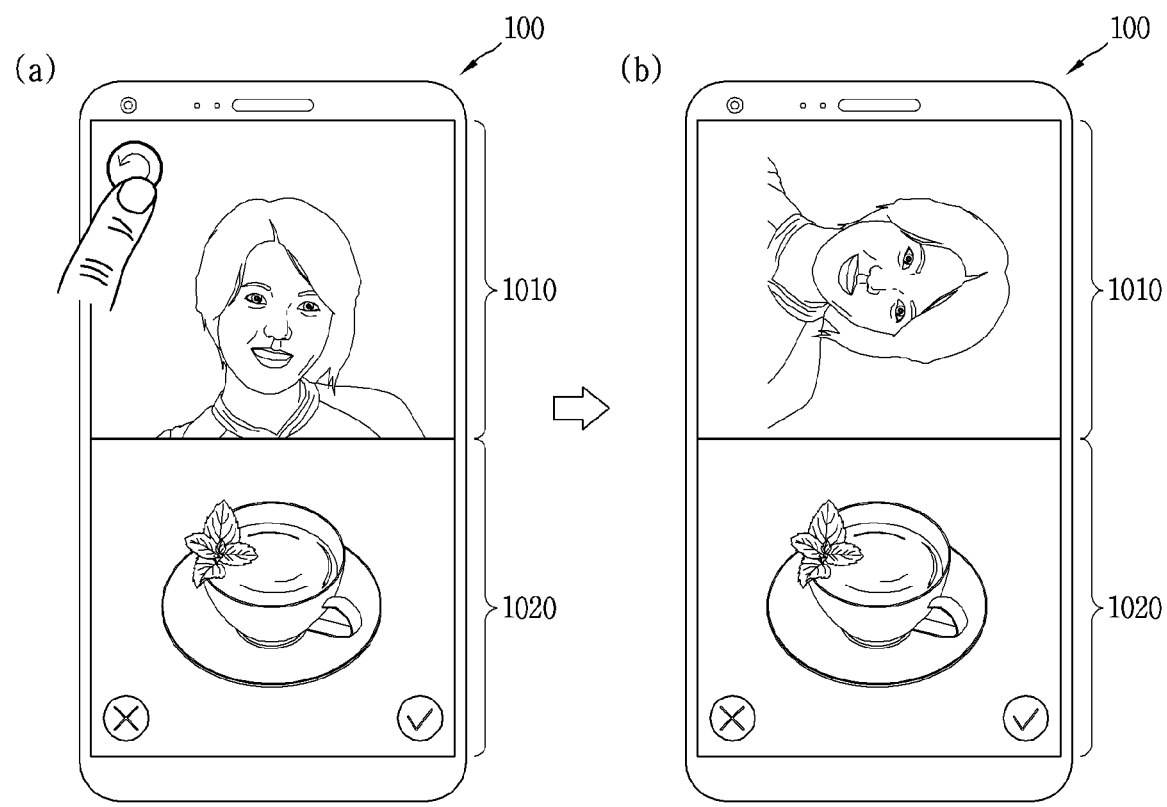
Figure 10C:
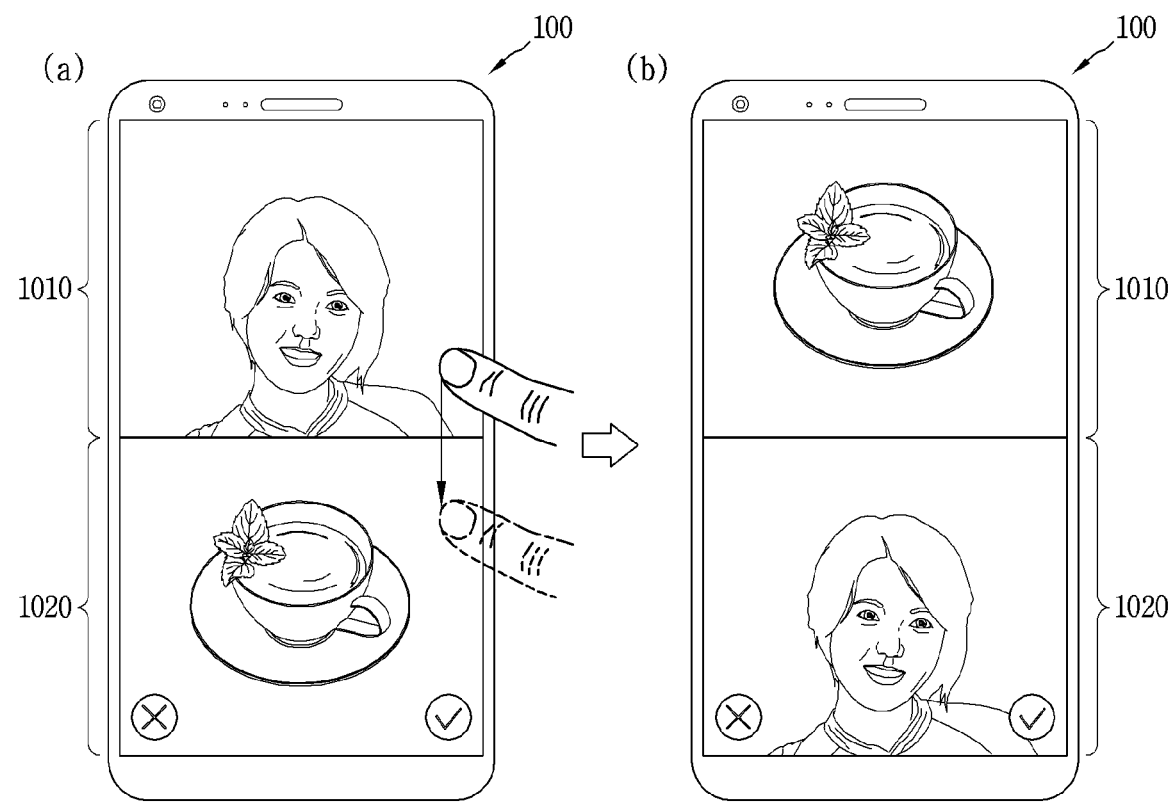

In addition, as illustrated in (a) of FIG. 10B, the controller 180 may rotate the image displayed on the first region 1010 such that a display direction of the image displayed on the first region 1010 is changed. More specifically, as illustrated in (b) of FIG. 10B, the controller 180 may rotate the image displayed on the first region 1010 by 90 degrees in a clockwise direction, in response to a touch input applied to a graphic object indicating a rotation command. Thereafter, the controller 180 may generate a composite image in the rotated state.

Also, as illustrated in (a) and (b) of FIG. 10O, the controller 180 may switch a display position of the image on the first region 1010 with a display position of the image on the second region 1020, in response to a drag input being applied from the first region 1010 to the second region 1020. Therefore, the controller 180 may individually set a position of each image before generating a composite image.

Figure 10D:
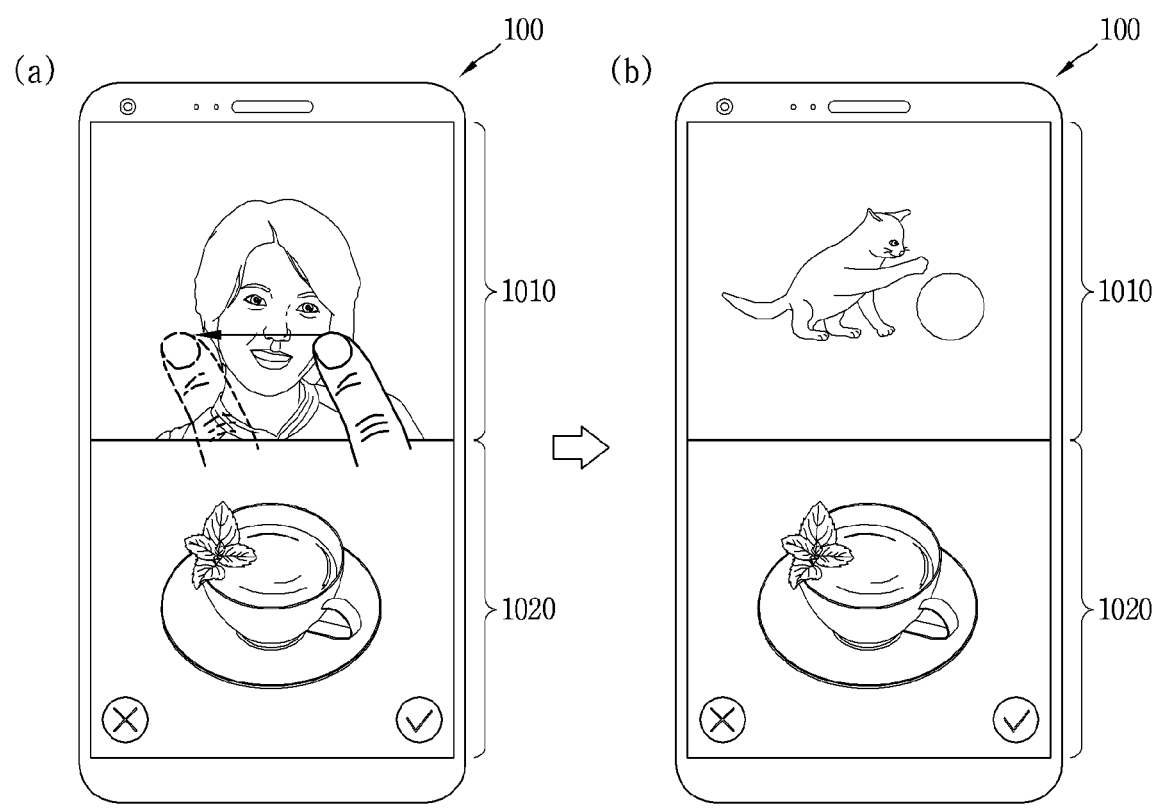

In addition, as illustrated in (a) and (b) of FIG. 10D, the controller 180 may output different images stored in the memory 170, in response to a flicking input being applied to the first region 1010 in a left or right direction. Therefore, the present disclosure can more conveniently select images to be merged before generating a composite image.

A mobile terminal according to the present disclosure can store a composite image together with original data of a plurality of images when generating the composite image by using the plurality of images, so that the composite image can be edited using the original data of the plurality of images. This may allow the composite image to be more easily edited after the generation of the composite image.

In addition, when a plurality of moving images is merged, the plurality of moving images can be simultaneously or sequentially played back based on a user's touch input with respect to the composite image.

The present disclosure can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

The invention claimed is:

1. A mobile terminal, comprising:
a camera configured to capture images;

a display having a first region to display a preview image received from the camera, and a second region to display the images captured through the camera in a preset layout; and a controller configured to capture the images through the camera based on a capture command, display the images captured through the camera on the second region according to the preset layout, and generate a composite image based on a user control command for storing the composite image while the captured images are displayed on the second region, wherein the controller generates a composite object corresponding to the preset layout for the generation of the composite image, generates linkage information between the generated composite object and image data of the captured images in a manner that the captured images are located in specific sizes at specific positions of the composite object, and generates the composite image based on the generated linkage information and original data of the captured images, wherein the composite object is stored together with the original data of the captured images, image data of the composite image, and the linkage information, and wherein the linkage information includes relative position information among the image data, and size information related to the image data.

2. The mobile terminal of claim 1, wherein the controller executes an edit mode when a preset touch is applied to the composite image, changes position information or size information using the original data stored together with the composite image based on a control command for changing positions or sizes of the images forming the composite image in the edit mode, and re-generates linkage information including the changed position information or size information.

3. The mobile terminal of claim 1, wherein the controller extracts image data corresponding to a plurality of faces included in the preview image based on a face recognition algorithm, and processes the extracted image data corresponding to the plurality of faces to be linked with the composite object.

4. The mobile terminal of claim 1, wherein the controller determines a layout of the composite object based on a number of persons indicated by the plurality of faces corresponding to the extracted image data.

5. The mobile terminal of claim 1, wherein the controller sequentially plays back the captured images according to a trajectory of a touch input applied to the composite image when the captured images are moving images.

6. The mobile terminal of claim 5, wherein the controller sequentially plays back the captured images based on an order in which the trajectory of the touch input is detected.

7. The mobile terminal of claim 5, wherein the controller sequentially plays back the captured images, in response to a release of the touch input.

8. The mobile terminal of claim 1, wherein the controller controls a volume of at least one of moving images included in the composite image based on a user control command when the captured images are the moving images.

9. The mobile terminal of claim 8, wherein the controller mutes the at least one moving image, in response to a touch input being applied to the at least one moving image while the moving images included in the composite image are being played back simultaneously.

10. The mobile terminal of claim 1, wherein the controller changes audio data of at least one of moving images included in the composite image into prestored audio data, based on a user control command, when the captured images are the moving images.

11. The mobile terminal of claim 10, wherein the controller outputs an audio list indicating the prestored audio data based on a user control command for changing audio data.

12. The mobile terminal of claim 1, wherein the controller controls the camera to capture a new image to be merged at a position where a specific image has been displayed, in response to a touch input being applied to the specific image among the captured images.

13. The mobile terminal of claim 12, wherein the controller displays the captured new image at the position where the specific image has been displayed when the new image is captured through the camera.

14. The mobile terminal of claim 1, wherein the image data of each of the captured images has a different data format.

* * * * *